United States Patent [19]
Stearns

[11] 3,794,227
[45] Feb. 26, 1974

[54] BICYCLE CARRIER FOR VEHICLES

[76] Inventor: Stanley D. Stearns, 1641 Coral Gate Dr., Miami, Fla. 33145

[22] Filed: May 3, 1972

[21] Appl. No.: 250,014

[52] U.S. Cl.......... 224/42.01, 224/42.03 B, 211/22
[51] Int. Cl............................................. B60r 9/10
[58] Field of Search......224/42.03 B, 29 R, 42.01, 224/42.43, 42.44, 42.42 R; 211/177, 211/20, 21, 22; 248/126, 129

[56] References Cited
UNITED STATES PATENTS

| 3,561,606 | 2/1971 | Stewart | 248/129 X |
| 3,176,903 | 4/1965 | Farley | 224/42.03 B |
| 2,432,732 | 12/1947 | Del Cano | 224/42.03 B |
| 1,586,854 | 6/1926 | Stansfield | 211/22 |

FOREIGN PATENTS OR APPLICATIONS

| 38,139 | 11/1927 | Denmark | 224/42.03 B |
| 148,378 | 0/1951 | Sweden | 224/42.03 B |
| 625,461 | 0/1949 | England | 224/42.03 B |

Primary Examiner—Gerald M. Forlenza
Assistant Examiner—Jerold M. Forsberg
Attorney, Agent, or Firm—Clarence A. O'Brien; Harvey B. Jacobson

[57] ABSTRACT

A pair of horizontally spaced uprights including mounting structure at their lower ends for securement from a vehicle end portion and including a pair of support arms having base ends thereof secured to the upper end portions of the uprights with the other ends of the support arms projecting outwardly of the uprights in a direction generally normal to a line extending between the uprights. The base ends of the support arms are pivotally supported from the uprights for angular displacement about generally aligned horizontal axes and the support arms are swingable upwardly from outwardly projecting slightly upwardly inclined positions to positions swung at least somewhat past the vertical. In addition, a support base accessory is provided and includes structure for coaction with and support of the lower end portions of the uprights therefrom by means of the aforementioned mounting structure carried thereby.

6 Claims, 6 Drawing Figures

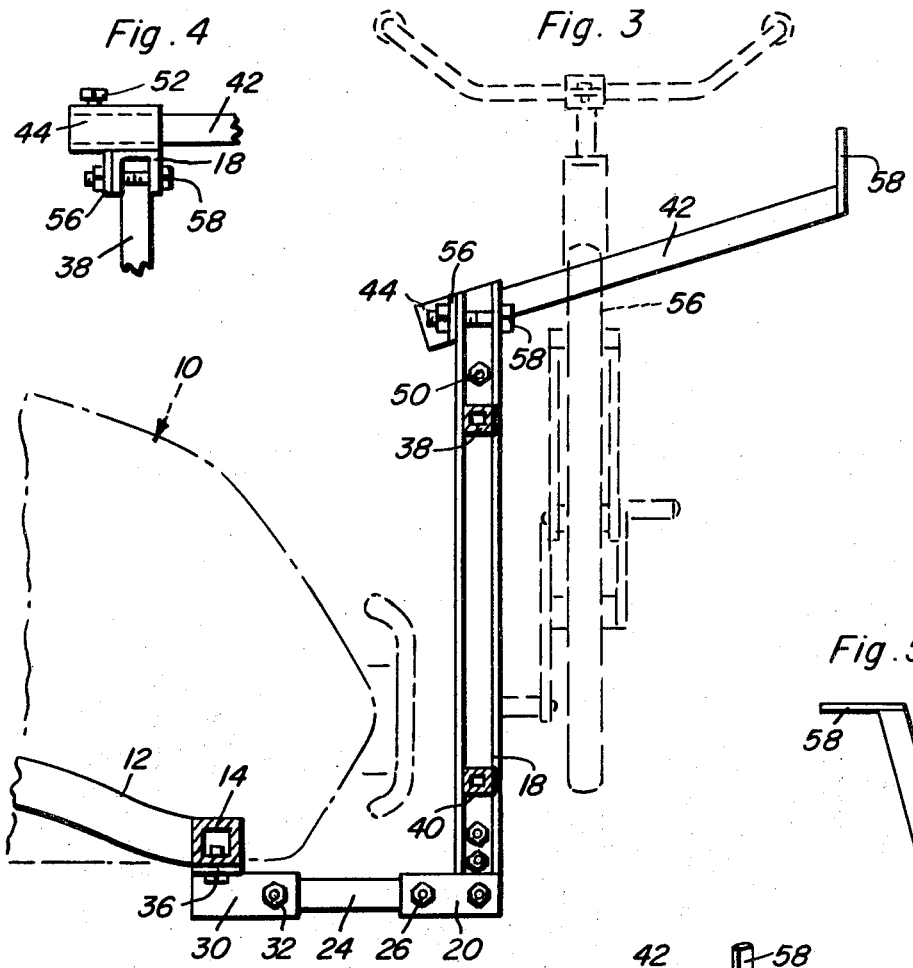

BICYCLE CARRIER FOR VEHICLES

The cycle carrier of the instant invention has been designed to provide a readily mountable and disconnectible carrier for bicycles and other cycles on a motor vehicle. The carrier is designed to support lightweight cycles only and cycles which are provided with spoked wheels. However, the carrier could be readily modified for supporting other articles from the associated vehicle.

The carrier utilizes structural components which are readily commercially available and may be purchased at a low cost and readily fabricated into the components of the carrier. In this manner, the carrier may be readily produced in various areas and the construction of the carrier is such that it may be readily broken down into a plurality of components for compact storage and shipment.

The main object of this invention is to provide a cycle carrier for vehicles whereby lightweight cycles such as bicycles may be readily supported from a vehicle.

Another object of this invention, in accordance with the immediately preceding object, is to provide a cycle carrier that may be utilized to support a plurality of bicycles at the same time.

Still another object of this invention is to provide a cycle carrier for mounting on a vehicle constructed in a manner whereby it may be readily attached to substantially all makes of vehicles.

Yet another important object of this invention is to provide a cycle carrier in accordance with the preceding objects and which may be readily mounted upon and removed from an associated vehicle.

A final object of this invention to be specifically enumerated herein is to provide a cycle carrier in accordance with the preceding objects which will conform to conventional forms of manufacture, be of simple construction and easy to install so as to provide a device that will be economically feasible, long lasting and relatively trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 3 is an enlarged vertical sectional view taken substantially upon a plane passing through the center of the cycle carrier;

FIG. 4 is a fragmentary plan view illustrating the manner in which one of the support arms of the carrier is supported from and secured in operative position on the corresponding upright portion of the carrier;

FIG. 5 is a fragmentary sectional view similar to the upper portion of FIG. 3 but with the illustrated support arm of the carrier in an upwardly swung over-center positon; and FIG. 6 is a perspective view of the cycle carrier supported from a base accessory therefor.

Figure 1:
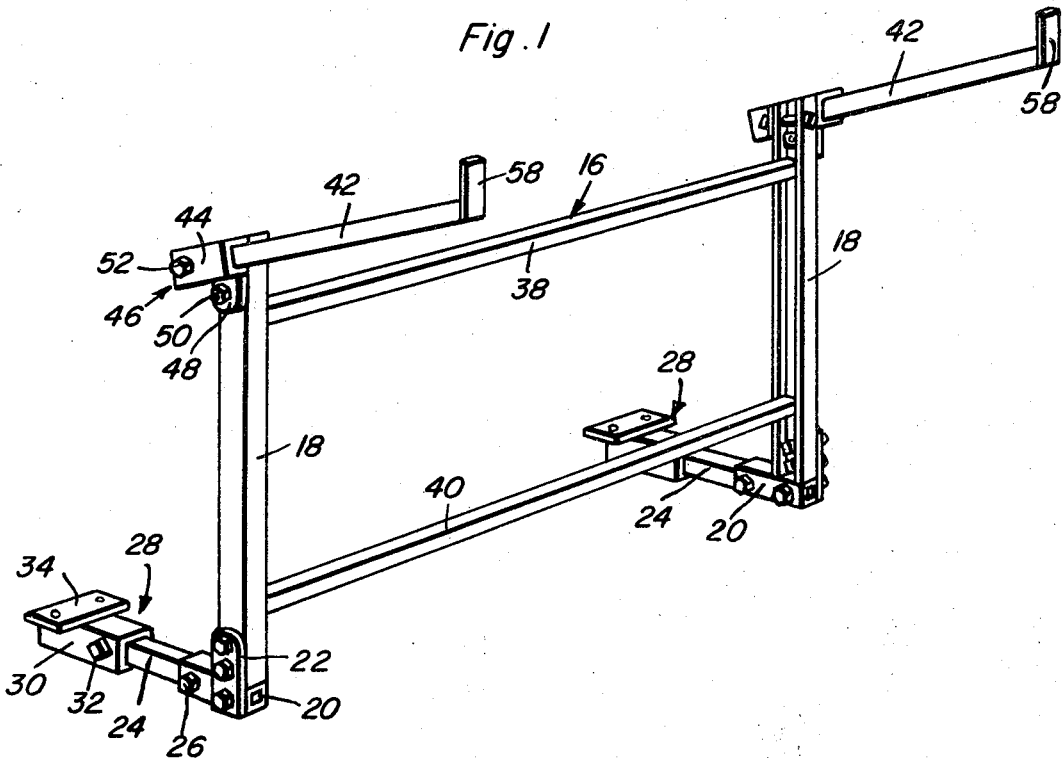
FIG. 1 is a perspective view of the cycle carrier.
Figure 2:
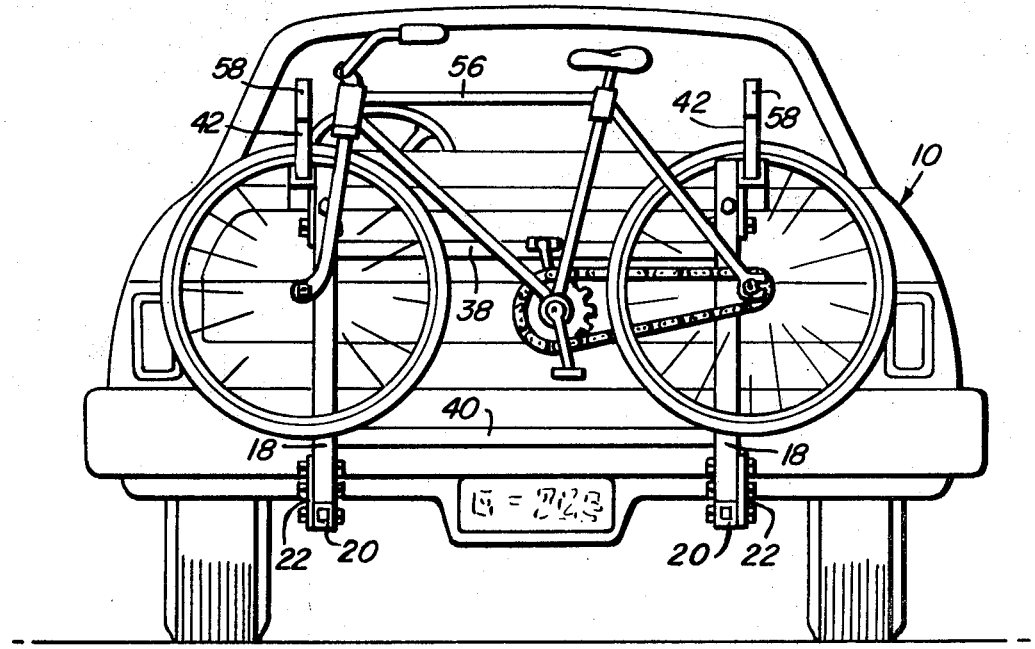
FIG. 2 is a rear elevational view of a conventional form of motor vehicle with the cycle carrier of the instant invention mounted from the vehicle and in use supporting a bicycle on the rear of the vehicle.

Referring now more specifically to the drawings, the numeral 10 generally designates a conventional form of motor vehicle including a frame 12 having a rear transverse member 14.

The cycle carrier of the instant invention is referred to in general by the reference numeral 16 and includes a pair of upright channel members 18 secured at their lower ends to corresponding ends of a pair of tubular members 20 by means of mounting straps 22 bolted both to the lower ends of the upright channel members 18 as well as the adjacent ends of the tubular members 20.

A pair of mounting arms 24 are provided and telescoped into the ends of the tubular members 20 remote from the lower ends of the uprights 18. The inwardly telescoped ends of the mounting arms 24 are secured in position by means of through bolts 26 secured through the tubular members 20 and the adjacent ends of the mounting arms 24.

A pair of mounting assemblies referred to in general by the reference numerals 28 are provided and include tubular sleeve portions 30 into which the ends of the mounting arms 24 remote from the tubular members 20 are telescoped. The mounting arms 24 are secured in the sleeve members 30 by means of through bolts 32 and each of the sleeve members 30 has an apertured mounting plate 34 secured to the upper surface portion thereof remote from the corresponding mounting arms 24. Each mounting plate 34 is removably secured, as by fasteners 36, to the transverse frame member 14. It is proposed that when it is desired to remove the carrier 16 from the vehicle 10, the through bolts 32 may be removed so that the mounting arms 24 may be disengaged from the sleeve members 30 and the mounting assemblies 28 remaining secured to the transverse frame member 14. However, as will be hereinafter more fully set forth, in some instances the mounting assemblies 28 will be removed from the vehicle 10.

The upright channel members 18 are interconnected by means of upper and lower horizontal brace members 38 and 40 extending and secured therebetween. The members 38 and 40 may be permanently secured between the channel members 18 in any convenient manner. However, if desired, any suitable other means may be utilized to removably secure the brace members 38 and 40 between the channel members 18 and if the cycle load to be carried by the carrier 16 is minimal, the brace members 38 and 40 may be omitted entirely.

A pair of support arms 42 are provided and have one pair of corresponding ends thereof telescoped into receiving sleeve portions 44 of a second pair of mounting assemblies generally referred to by the reference numerals 46. The mounting assemblies 46 include depending apertured mounting ears 48 pivotally secured to the upper ends of the uprights 18 by means of pivot fasteners 50 and through bolts 52 are utilized to secure the base ends of the support arms 42 within the sleeve portions 44.

Abutment flanges 56 are carried by and project laterally outwardly from the opposing sides of the sleeve portions and abut the forward surfaces of the channel members 18 when the support arms 42 are disposed in the operative positions thereof illustrated in FIG. 1 of the drawings. The abutment flanges 56 are apertured and through bolts 58 are provided and secured through the uprights 18 and the flanges 56 to lock the support arms 42 in the operative positions illustrated in FIG. 1. However, the through bolts 58 may be removed and the support arms 42 may have their free ends swung upwardly past vertical positions to the retracted positions thereof illustrated in FIG. 5 of the drawings. In this manner, when the carrier 16 is not in use, the support arms 42 may be swung to the inoperative positions thereof illustrated in FIG. 5 in order to reduce the amount the carrier 16 projects behind the vehicle 10.

When the support arms 42 are disposed and locked in their operative positions illustrated in FIGS. 1 and 3, one or more bicycles 56 may be supported from the support arms 42 with the latter extending between adjacent spokes of the upper peripheral portions of the wheels of the bicycle 56. The free ends of the support arms 42 are provided with upwardly projecting abutment flanges 58 whereby accidental sliding of the bicycle wheels off the rear ends of the support arms 42 will be prevented.

With attention now invited more specifically to FIG. 6 of the drawings, there will be seen a support base assembly referred to in general by the reference numeral 60 and comprising a pair of horizontally disposed L-shaped support base members 62. Each of the base members 62 includes a long horizontal leg 64 and a short upstanding leg 66 with a diagonal brace 68 secured between the legs 64 and 66. The upper end of the short leg 66 of each base member 62 is provided with opposite side outwardly projecting horizontal mounting flanges 70 and when the carrier 16 is removed, in its entirety, from the vehicle 10 the mounting assemblies 28 may be removed from the tubular members 20, rotated 180 degrees and again applied to the tubular members 20. Thereafter, the mounting assemblies 28 may be secured to the apertured flanges 70 by means of the aforementioned fasteners 36. In this manner, the carrier 16 may be readily supported from a horizontal support surface such as the floor of a garage.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A cycle carrier for mounting from the end of a vehicle, said carrier including a pair of laterally spaced uprights including mounting means carried by their lower ends adapted for support from selected vehicle portions, and a pair of support arms including base ends carried by the upper ends of said uprights with the other ends of said arms projecting outwardly from corresponding sides of said uprights in a direction generally normal to a line extending between said uprights, a pair of elongated sleeve members through which the base ends of said support arms are slidably received for longitudinal shifting of said support arms relative to said sleeve members, said sleeve members and support arms including coacting means operative to releasably secure said support arms in adjusted shifted positions relative to said sleeve members, means pivotally mounting said sleeve members to and alongside the upper ends of said uprights about generally aligned axes extending between said uprights and transversely of said sleeve members for angular displacement of said support arms between first limit positions of swinging movement with said other ends of said support arms inclined slightly upwardly and projecting outwardly from one side of an upstanding plane containing said uprights and second limit positions with said other ends of said support arms inclined upwardly and projecting outwardly of the other side of said plane, said sleeve members being spaced above said axes and including end portions projecting outwardly of the sides of said uprights remote from said other ends of said arms when said support arms are in said first limit positions, said end portions of said sleeve members including laterally outwardly projecting abutments disposed outwardly of said sides of said uprights remote from said other ends of said arms, said abutments being engageable with said sides of said uprights remote from said other ends of said arms to define said first and second limit positions of swinging movement of said support arms.

2. The combination of claim 1 wherein said mounting means comprises generally parallel horizontally directed mounting arms projecting outwardly from the lower end portions of said uprights in the direction opposite to which said support arms project.

3. The combination of claim 2 including a pair of mounting sleeves removably telescoped over the ends of said mounting arms remote from said uprights, said sleeves including mounting portions adapted for support from said vehicle portions.

4. The combination of claim 3 including a floor stand defining raised mounting portions, said sleeves being removably securable to said floor stand mounting portions.

5. The combination of claim 1 wherein said carrier includes a pair of vertically spaced generally horizontal brace members extending and secured between corresponding vertically spaced portions of said uprights.

6. The combination of claim 1 wherein the free ends of said support arms include laterally directed portions which project upwardly from said other ends of said arms when the latter are disposed in the first-mentioned limit positions thereof.

* * * * *